United States Patent

Herring

[15] 3,643,524
[45] Feb. 22, 1972

[54] CONTROL PEDALS FOR VEHICLES

[72] Inventor: Lloyd D. Herring, Jenison, Mich.
[73] Assignee: General Motors Corporation, Detroit, Mich.
[22] Filed: May 26, 1970
[21] Appl. No.: 40,668

[52] U.S. Cl. .................................. 74/512, 74/513, 74/519, 74/560
[51] Int. Cl. ......................................................... G05g 1/14
[58] Field of Search .......................... 74/512, 513, 519, 474.8

[56] References Cited

UNITED STATES PATENTS 3,282,125  11/1966  Dully .................................... 74/512 X
3,563,111   2/1971  Zeigler .................................... 74/512

Primary Examiner—William F. O'Dea
Assistant Examiner—F. D. Shoemaker
Attorney—W. E. Finken and D. L. Ellis

[57] ABSTRACT

Control pedal apparatus including brake and accelerator pedals adapted for connection with the brake and throttle mechanisms of an automotive vehicle further includes a pivoted brake pedal carrier member suitably swingably mounted on support structure of the vehicle and an accelerator pedal bracket fixedly mounted on such support, each carrier and bracket having mounted for rotation thereon an Acme screw. One such screw carries an integrally formed nut end portion of the brake pedal member while the other rotatably mounts an elongated nut or throttle pedal carrier member pivotally carrying on a distal end thereof a low-pivoted accelerator pedal member. Linkage between the support structure, the accelerator carrier and the pedal thereon adjusts the vertical attitude of the pedal on the carrier during rotation of the corresponding screw. The accelerator pedal connects with the vehicle throttle through push-pull cable means arranged to transfer actuation through flexure of a loop portion thereof within the passenger compartment.

6 Claims, 3 Drawing Figures

INVENTOR.
Lloyd D. Herring
BY D. L. Ellis
ATTORNEY

PATENTED FEB 22 1972

INVENTOR.
Lloyd D. Herring
BY
D. L. Ellis
ATTORNEY

3,643,524

CONTROL PEDALS FOR VEHICLES

This invention relates to vehicle control pedals and more particularly to improvements in vehicle accelerator or throttle control pedals and the like.

A principal feature of this invention is that it provides improved automotive vehicle accelerator or throttle control pedal or like pedal apparatus utilizing flexible push-pull cable means for transferring foot motion to the vehicle throttle or like mechanism and arranged in such a way that the cable, while conventionally passing through the firewall or other bulkhead of the vehicle to transfer the actuation between the passenger area pedal and the engine compartment throttle, does not require provision for relative sliding motion between the cable and the firewall which might lead to cable abrasion, kinking or other undesirable results.

Particularly is this valuable when used in an adjustable control pedal scheme, which usually requires such relative motion between the throttle cable and the firewall. In my apparatus, the push-pull cable is looped within the passenger compartment and attached to the pedal and to the throttle mechanism in such a way that not only does the loop accommodate positional pedal adjustment, but actuating motion applied to the pedal by the foot is transferred to the throttle completely by flexure of the looped portion of the cable sheath, obviating the need for relative motion between the sheath and the firewall at their juncture.

Another principal feature of this invention is that it provides adjustable control pedal apparatus including a throttle pedal or the like as aforedescribed wherein the actual foot pedal member is of the low pivot variety; i.e., pivotally mounted adjacent its lower end on a pedal carrier for forward and downward movement from a normal unactuated position, means being further provided responsive to selected positional adjustment of the accelerator pedal carrier fore and aft within the passenger compartment to vary the angular attitude of the pedal on the carrier between various corresponding attitudes selected for each pedal carrier position to maximize the ankle comfort of the vehicle operator in the use of such pedal.

As a more specific feature connected with the immediate preceding, linkage means are provided between the instrument panel or other support for the pedals and the adjustable pedal carrier, and further between such carrier and an actuating lever pivoted intermediate its ends on the pedal carrier, such actuating lever being connected at one end with the sheath of the throttle push-pull control cable and its other end engaged with the low pivot pedal member. The linkage is so arranged that in a most forward position of the pedals away from the passenger seat, the throttle pedal takes a relatively vertically disposed attitude for the long legged driver, while in the most rearward position close to the passenger seat, the pedal member takes a more flat or horizontal attitude for the short legged driver, the pedal attitude varying progressively between these limit conditions as the pedals are positionally adjusted.

These and other features and advantages of the invention will be readily apparent from the following specification and from the drawings wherein.

Figure 1:
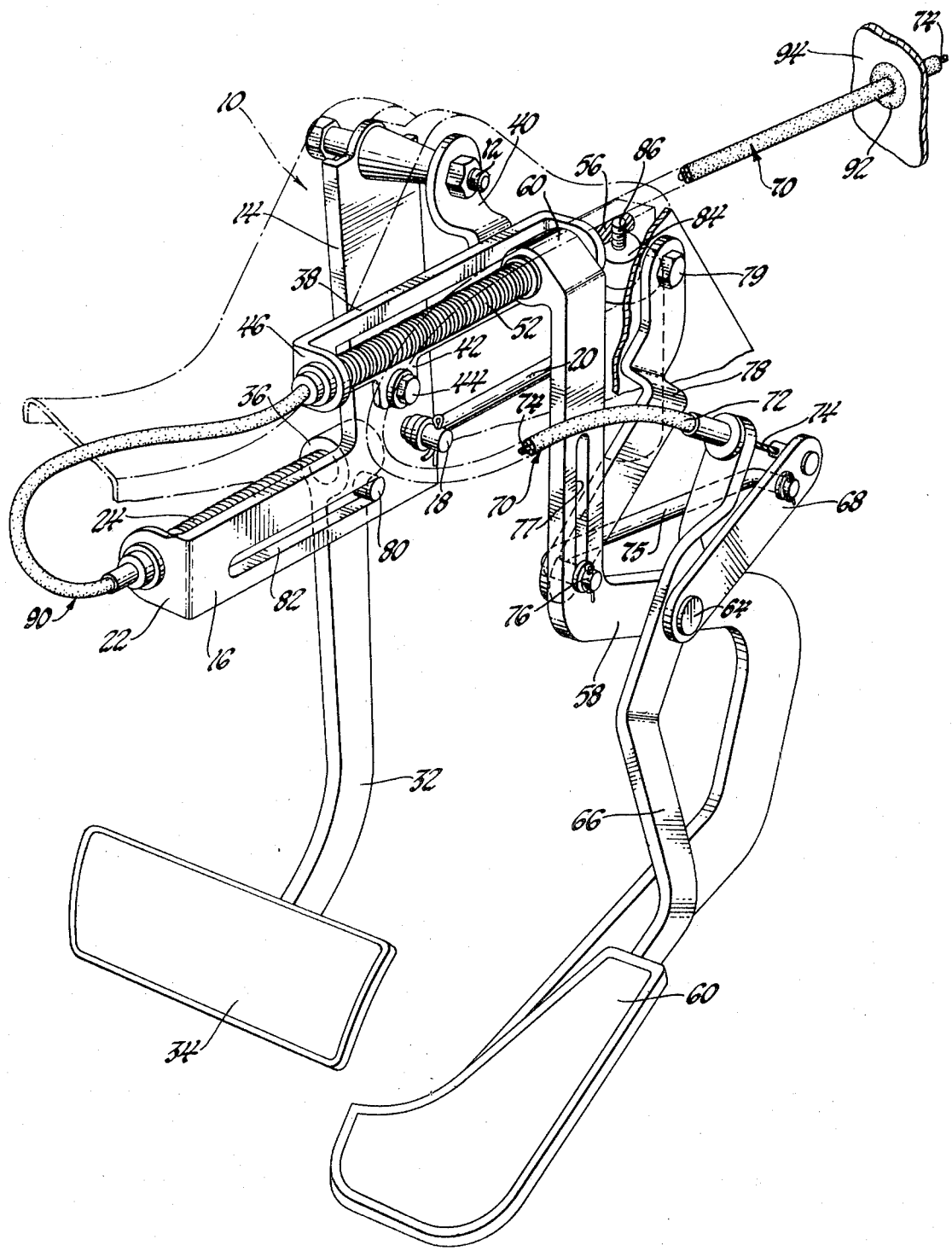
FIG. 1 is a perspective view, partially in phantom, of adjustable control pedal apparatus according to this invention.

Referring now particularly to FIG. 1 of the drawings, the reference numeral 10 indicates pedal supporting structure of an automotive vehicle adapted to mount the control pedal apparatus of this invention therewithin. Typically, such structure is within the vehicle passenger compartment proximate the vehicle firewall and underneath the usual instrument panel structure within the vehicle body and more particularly, takes the form of a boxlike structure open on its underside to exhibit a generally U-shape in section and extending from rigid attachment at its forward extremities to the vehicle firewall and suitably attached at its rearward extremities to ties or brace structure within the instrument panel. Between such extremities, the support structure includes a brake pedal support shaft 12 secured at its opposite ends by threaded connection to opposite sidewalls of the support structure. Journaled intermediate the ends of shaft 12 and within the support structure is one leg of an L-shaped brake pedal carrier member 14. The other leg 16 of the carrier extends in a fore and aft direction longitudinally of the vehicle. Adjacent the intersection of the two legs of the carrier a pivot stud 18 is provided to receive and hold one end of a brake mechanism control rod 20 extending forwardly of the carrier 14 in conventional fashion to be received through an aperture in the vehicle firewall and connected to the vehicle brake mechanism for selected operation of the latter under forward thrust and displacement of the control rod. The leg 16 is provided at opposite ends with bent flanges, as at 22, which are suitably apertured and provided with bearings to receive and rotatably support opposite ends of an adjusting screw 24. The screw is preferably of a low cost Acme thread construction exhibiting a medium mechanical efficiency but may of course alternatively be provided with antifriction ball screw form adapted for use with a recirculating ball nut.

Figure 2:
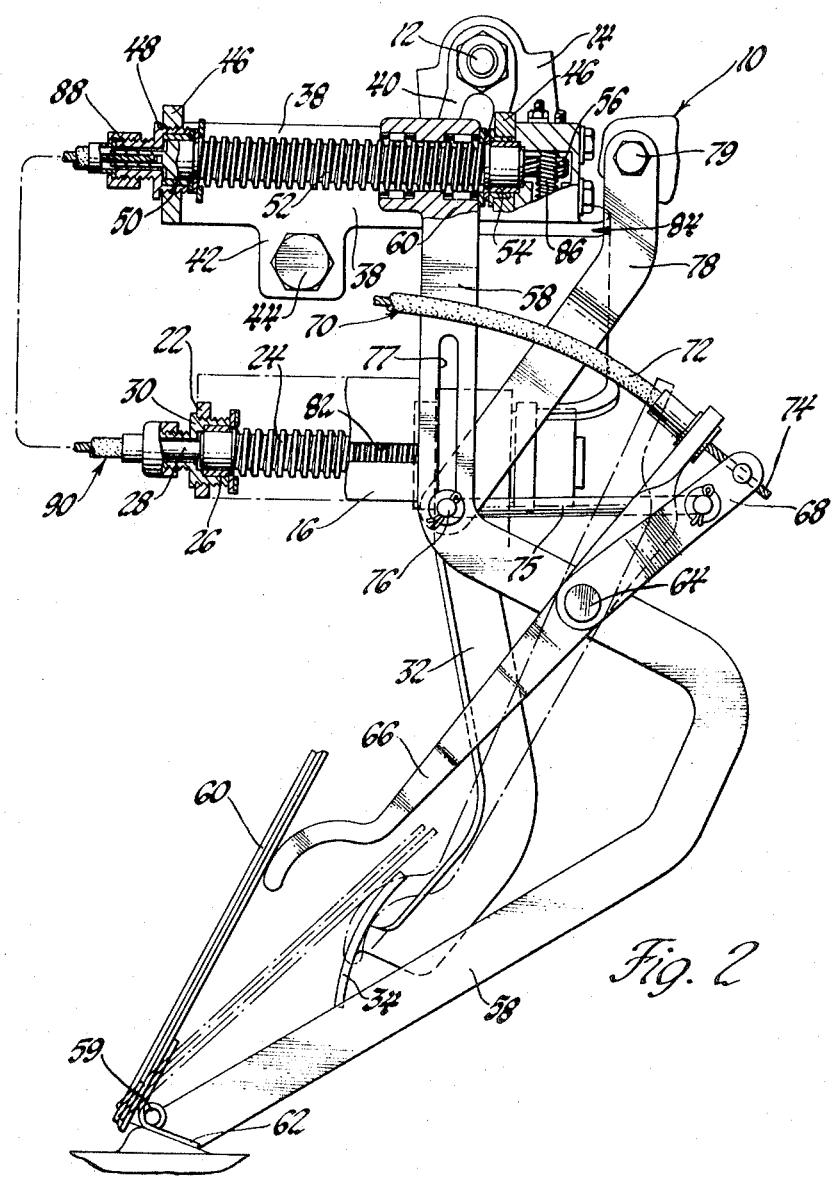
FIG. 2 is a sectional view through laterally spaced planes of the control pedal apparatus showing the pedal members in a most forward adjusted position in solid lines and in another adjusted position in broken lines.

Referring to FIG. 2, the bearings at each end of the screw may be provided suitably of antifriction material sleeves 26 receiving smooth shaft ends of the screw 24. The rearward end of screw 24 includes a double D-shaped or like drive spindle 28 extending through a threaded cable mounting stud conformation 30 received in the aperture of flange 22 and carrying the bearing sleeve 26.

A brake pedal member 32 of an elongated conventional configuration includes on its distal end the usual foot pad 34. At its other end, the brake pedal is bored to receive therein a two-part Acme nut 36 which is set into the bore from opposite sides and has the screw 24 threadably engaged therethrough. Suitable exterior flanges on the nut 36 provide shoulders engaging the upper end of the brake pedal so that screw rotation and axial thrust on the nut carries the brake pedal in a fore and aft path along the axis of the screw depending upon direction of screw rotation. Such fore and aft travel takes place between a most forward adjusted position proximate the firewall in the solid lines in FIG. 2 and any of a plurality of more rearward positions such as that indicated in broken lines.

Referring again to FIG. 1, there is attached to the right sidewall of the support structure 10 on the exterior thereof an accelerator pedal mounting bracket 38 having a first ear 40 attached on the exposed end of support shaft 12 and held by a nut, while another ear 42 depends from the bracket and is likewise attached by a fastener 44 to the sidewall of the support structure, thereby to rigidly attach bracket 38 thereto. Bracket 38 also includes at opposite ends a pair of laterally extending flanges 46 bored to receive in the forward flange another cable connecting stud 48 receiving a similar bearing sleeve 50 journaling a smooth shaft end of a second Acme adjusting screw 52. At the other end, the screw includes a smooth shaft end journaled in a plain sleeve bearing 54 retained in the flange 46, such smooth end having integrally formed thereon a driven gear 56.

A pedal carrier member 58 of elongated configuration includes at its upper end 60 a bored and integrally threaded nut portion threadably receiving the Acme screw 52 whereby the nut member is translatable fore and aft on bracket 38 under rotation of the screw between a most forward position, shown in solid lines, and any of a plurality of more rearward positions such as indicated in broken lines. At the opposite distal end thereof, carrier member 58 includes a mounting pin 59 pivotally supporting the lower end of an accelerator pedal 60. A coil torsion spring 62 between the pedal and carrier biases the former clockwise. Intermediate its ends, carrier 58 mounts on a common journaling stud 64 thereof an actuating lever 66 and a reaction lever 68. The lower end of lever 66 underlies the upper portion of the low-pivoted pedal 60 while its upper end is provided with a bore and suitable fixed connection therewithin of the ferruled end of the sheath portion 72 of a push-pull actuating cable assembly 70. The corresponding end of the core 74 of the cable assembly is brazed or otherwise fixed to a pin mounted in the upper end of the reaction lever 68. With this arrangement, foot pressure depression of pedal 60 clockwise from a normal nonactuated position, shown in solid lines in FIG. 2, results in counterclockwise rotation of lever 66 to actuate the vehicle throttle through cable assembly 70 as will be described.

Attitude adjusting linkage for the pedal 60 includes a link 75 having one bent end fixedly pivotally attached to the upper end of reaction lever 68 and fixed at its other end to a pin 76 located in a slot 77 of carrier 58. Also pivotally connected to pin 76 is one end of a lever 78 which is pivotally secured at its other end to support 10 by a stud 79 located on a preselected axis to provide a pedal attitude variation later to be described.

As seen best in connection with the brake pedal 32, the same includes adjacent its upper nut portion 36 a laterally extending pin 80 received in an elongated slot 82 in carrier 14. Close confinement of the pin and slot prevents any substantial reactive displacement of the brake pedal laterally of the carrier during rotation of screw 24. Similar torque restraining structure may be provided between the carrier 58 and the bracket 38.

Thus, in any adjusted position of the pedal members 32 and 60 on their respective screws, such as the most forward position shown in solid lines, the above described pressure on the accelerator foot pad 68 is always operative to control the vehicle throttle mechanism in normal manner, while similarly, actuating foot pressure applied to the brake footpad 36 is operative to rotate the carrier 14 about support shaft 12 and apply thrust through control rod 20 to actuate the vehicle brake mechanism. It is of course understood that the brake and accelerator assemblies may be caused to seek their unactuated positions shown by the normal return spring apparatus embodied in both the brake and throttle mechanisms.

To provide selected adjustment of the brake and accelerator units fore and aft of the vehicle relative to the passenger seat, a reversible electric motor and reduction gear unit 84 is mounted to support structure 10 adjacent the driven gear 56 with an output or drive gear 86 of such unit engaged therewith. Depending upon the selected direction of motor rotation controlled by suitable switch means located on the vehicle instrument panel or elsewhere, shaft 52 may be rotated to linearly displace nut member 58, the accelerator pedal, and flexible cable 72 along the axis of the screw 52 to any desired position.

As seen in FIG. 2, the rearward end of screw 52 includes a connector extension 88 within the cable mounting stud 48 adapted for nonrotatable connection with one end of the core of a rotary drive cable assembly 90. Cable 90 is secured to the stud 48 by a threaded cap and extends to loop over and into the interior of support structure 10 to have connection at its other end with the spindle 28 of screw 24, this being held by another threaded cap engaged on the stud 30. The screws 24 and 52 are thus connected in tandem so that actuating rotation caused in the screw 52 is also transferred through the cable to screw 24 whereby the brake and accelerator pedals may be adjusted in unison to coordinated desired positions.

It is to be recognized that more than the two brake and accelerator assemblies can be provided according to the concepts of the invention, all mounted on the same support structure 10 by additional support shafts such as that mentioned above. Additional tandem cable drive may be provided for additional pedal assemblies to have the motor and reduction gear unit 84 operative thereupon. Alternatively, as in the case of four adjustable pedals, including a clutch pedal and an emergency brake pedal, it may be desirable to provide therefor another separate motor and reduction gear unit with tandem cable drive, depending upon the size of electric motor desired and the application to the pedal unit.

In addition to the low cost of Acme screws, the latter may also provide a desired advantage in their ability to transfer any normal amount of foot pressure through brake pedal 32 and carrier 58 to cause sufficient frictional drag in the threading to stall out the motor and gear unit 84. Thus, in the event of foot pressure applied to the brake pedal during simultaneous inadvertent actuation of the motor unit to adjust the pedal, the motor will be inoperative to disrupt or alter the braking actuation applied thereto. Alternatively, with the antifriction ball screw previously mentioned, suitable switch gear may be provided to open the energizing circuit for the motor when either pedal is displaced from its unactuated position.

Figure 3:
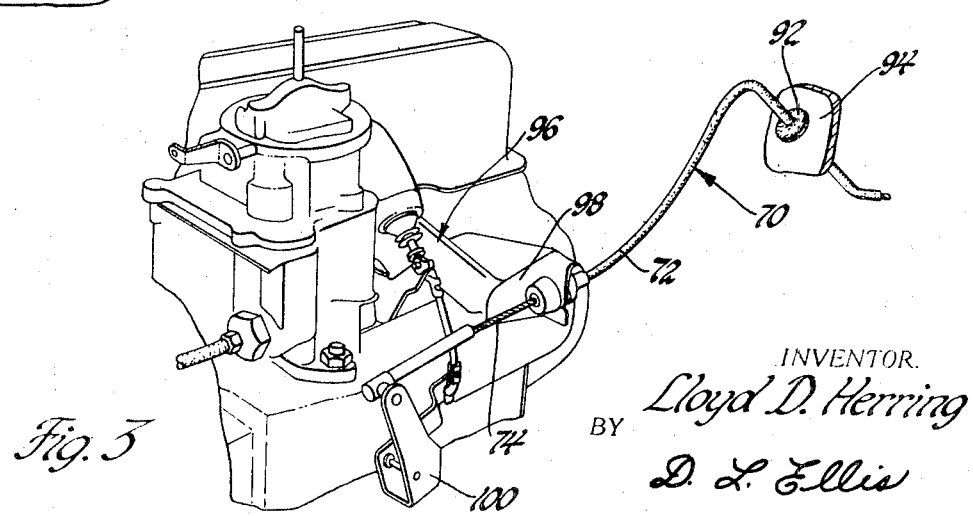
FIG. 3 is a perspective view of the vehicle engine compartment including the engine throttle and pedal connection thereto.

As set out hereinabove, the instant throttle control pedal departs from past practice using push-pull cables in that the actuating lever 66 has direct connection with the sheath 72 of the cable rather than the core, the latter being fixed to reaction member 68. Cable 70 is routed from this connection underneath the instrument panel in a fashion to form a rather loose or relatively large radius loop thereunder, the cable turning forwardly of the vehicle in such loop to pass along the right side of support 10 and into a suitable grommet 92 fixed in an aperture in the vehicle firewall 94, indicated in FIG. 1. Referring to FIG. 3, after passing through such grommet, the cable assembly 70 has the usual connection with the vehicle engine throttle mechanism indicated at 96. Specifically, the sheath 72 of the cable has fixed connection on a bracket 98 of the vehicle carburetor and intake manifold assembly, the core 74 of the cable extending therethrough to connection with one leg of an actuating bellcrank 100 connected with the throttle mechanism 96. As mentioned, suitable return spring apparatus in the throttle mechanism 96, or alternatively on bellcrank 100, serves to locate core 74 in a relative position within sheath 72 inside the vehicle engine compartment to dictate the normal or nonactuated position of accelerator pedal 60.

Reverting to FIG. 2, this latter position is shown in solid lines and it is seen that actuating foot pressure rotating pedal 60 clockwise from this normal position causes sheath 72 to be displaced rearwardly. Since the other end of the sheath is fixed, the result is a flexure of the sheath within the passenger compartment increasing the radius of the loop or otherwise to accommodate the rearward displacement of its terminal end. Accordingly, no relative sliding displacement between grommet 92 and sheath 72 obtains and a wear-free weathertight connection therebetween is thus afforded. The entire actuating motion transmission in the cable assembly is by virtue of such flexure in the passenger compartment of the vehicle. The end of core 74 being held stationary on lever 68, movement or flexing of the interior loop of sheath 72 must be accommodated by relative motion between the core at bellcrank 100 and bracket 98 to cause actuation of the engine throttle. It will of course be understood that sheath 72 may terminate fixedly at the firewall instead of guiding the core all the way to bracket 98.

As also indicated hereinabove, the instant invention contemplates that the attitude of pedal 60 angularly with respect to carrier 58 may be varied in accordance with the positional fore-and-aft adjustment selected for the pedal assembly by actuation of motor and gear unit 84. Specifically, assuming that the pedals are located in their most forward position, shown in solid lines in FIG. 2, it is seen that actuation of the gear and motor unit moving carrier 58 leftwardly will result in pin 76 being forced to translate upwardly the slot 77 due to the circular constraint of lever 78 about its pivot at stud 79. Such upward translation carries the link 75 upwardly to in turn pivot reaction lever 68 counterclockwise. This rotation likewise carries core 74 and sheath 72 counterclockwise about stud 64 thereby to rotate actuating lever 66 from its normal nonactuated position shown in broken lines toward another normal nonactuated position indicated in broken lines. This latter indicated position obtains in the most rearward adjusted position of carrier 58, and it is understood that a plurality of intervening positions between those shown occurs in the range of travel of such carrier. In the two limit positions indicated in FIG. 2 for actuating lever 66, there is a corresponding set of limit angular attitudes of pedal 60 indicated in solid and broken lines. In the most forward position, shown in solid lines, it is seen that pedal 60 takes the somewhat elevated or more vertical orientation on the carrier 58 which has been found comfortable for ankle posture of those vehicle operators with longer legs requiring the indicated forward position of the pedals. For those operators with shorter legs, the rearward adjustment of carrier 58 brings the normal nonactuated position of pedal 60 into a flatter or more horizontal attitude or inclination on the carrier, this also being found to maximize comfort of the operator's ankle. The movement of the actuating lever 66 between these limit conditions of course is followed by the change in attitude of pedal 60 by virtue of the constant clockwise torsional bias on pedal 60 imparted by torsion spring 62.

Having thus described the invention, what is claimed is:

1. In a vehicle including a passenger compartment separated by a firewall from the engine compartment thereof, which latter contains a mechanism to be operated, control foot pedal apparatus comprising, a support located within said passenger compartment, a pedal carrier, means mounting said pedal carrier from said pedal support for selected positional adjustment relative thereto between a plurality of positions, an actuating member movably mounted on said carrier and responsive to foot pressure applied thereto to move between a normal unactuated position and a fully actuated position, a push-pull connecting cable assembly including a core and a sheath, said push-pull cable being looped within said passenger compartment at least singly in a direction rearwardly thereof and then forwardly thereof and extending through an aperture in said firewall to within said engine compartment, means connecting the one end of said sheath in the passenger compartment to said actuating member and the corresponding end of said core fixedly to said carrier, and means connecting the other end of said core to a movable element of the mechanism to be operated and mounting the corresponding end of said sheath fixedly to a stationary portion thereof, whereby said looped push-pull cable accommodates positional adjustment of said carrier relative to said support without relative displacement between the portion of said cable within the engine compartment and the firewall and whereby actuating foot pressure moving said actuating member from the normal position thereof results in flexure of the looped portion of said cable to cause actuation of said mechanism to be operated without relative displacement between the portion of said sheath within the engine compartment and the firewall.

2. In a vehicle including a passenger compartment separated by a firewall from the engine compartment thereof, which latter contains a mechanism to be operated, control foot pedal apparatus comprising, a support located within said passenger compartment, an elongated actuating member pivotally mounted intermediate its ends on said support, means on one end of said actuating member responsive to foot pressure applied thereto to cause movement of said actuating member between a normal unactuated position and a fully actuated position, a push-pull connecting cable assembly including a core and a sheath, said push-pull cable being looped within said passenger compartment firstly rearwardly thereof and then forwardly thereof and extending through an aperture in said firewall to within said engine compartment, means for connecting the one end of said sheath in the passenger compartment to the other end of said actuating member and the corresponding end of said core to said support, and means in said engine compartment connecting the other end of said core to a movable element of the mechanism to be operated and mounting the corresponding end of said sheath fixedly to a stationary portion thereof, whereby actuating foot pressure moving said actuating member from the normal position thereof results in flexure of the looped portion of said cable to cause actuation of said mechanism to be operated without relative displacement between the portion of said sheath within the engine compartment and the firewall.

3. In automotive vehicle adjustable control foot pedal apparatus for a mechanism to be operated, a support, a pedal carrier, means mounting said pedal carrier pendently from said support for selected adjustment positionally relative thereto between a plurality of positions including a forwardmost and a rearwardmost position, a foot pedal, means mounting said foot pedal adjacent the lower end thereof on the distal end of said carrier for pivotal movement of the portion of said pedal above said lower end mounting thereof in an actuating path between a normal nonactuated position and a fully actuated position, motion transmitting means connecting said upper portions of said pedal with the mechanism to be operated so that the latter responds to movement of the former in said actuating path thereof, biasing means applied through said motion transmitting means to urge said pedal to the normal position thereof, means operative to selectively move said pedal carrier together with said pedal and said motion transmitting means positionally relative to said support, and means responsive to operation of said moving means to cause positional adjustment of the normal position of said pedal angularly with respect to said carrier between a plurality of attitudes including a first limit angular attitude in the forwardmost position of said carrier suitable to operator ankle comfort therein, and a second angular limit attitude in the rearwardmost position of said carrier suitable to operator ankle comfort therein.

4. In automotive vehicle adjustable control foot pedal apparatus for a mechanism to be operated, a support, a pedal carrier, means mounting said pedal carrier pendently from said support for selected adjustment positionally relative thereto between a plurality of positions including a forwardmost and a rearwardmost position, a foot pedal, means mounting said foot pedal at the lower end thereof on the distal end of said carrier for pivotal movement of said pedal thereabout in an actuating path between a normal nonactuated position and a fully actuated position, motion transmitting means including a lever pivotally mounted intermediate its ends on said carrier and connecting said pedal with the mechanism to be operated so that the latter responds to pivoting of said lever under movement of said pedal in said actuating path thereof, biasing means urging said pedal to the fully actuated position thereof, biasing means applied through said motion transmitting lever and operative to normally overcome the first-mentioned biasing means to urge said pedal to the normal position thereof, means operative to selectively move said pedal carrier together with said pedal and said motion transmitting lever positionally relative to said support, and means responsive to operation of said moving means to positionally adjust said motion transmitting lever independently of the influence of the last-mentioned biasing means whereby to cause positional adjustment of the normal position of said pedal angularly with respect to said carrier between a plurality of attitudes including a first limit angular attitude in the forwardmost position of said carrier suitable to operator ankle comfort therein, and a second angular limit attitude in the rearwardmost position of said carrier suitable to operator ankle comfort therein.

5. Adjustable control foot pedal apparatus as recited in claim 4 wherein said responsive means includes an attitude lever connected by pin and slot means with said carrier and further with a link connected to a cable core support pivoted to said carrier, relative motion between said carrier and said support and attitude lever causing relative motion between said cable core support, said actuating lever and said carrier.

6. Control foot pedal apparatus for automotive vehicles having passenger and engine compartments spaced by a firewall and a mechanism to be operated within the engine compartment, comprising, a support located within the passenger compartment, a pedal carrier mounted on said support for positional adjustment selectively relative thereto, an actuating member movably mounted on said carrier for movement between a normal unactuated position and a fully actuated position, a foot pedal pivotally mounted at one end thereof on the distal end of said carrier and engaged with said actuating member whereby foot pressure applied to said pedal moves the latter from said normal position thereof, a push-pull connecting cable assembly including a core and a sheath and being looped within said passenger compartment at least singly in a direction rearwardly thereof and then forwardly thereof and extending through an aperture in said firewall to within said engine compartment, means connecting the one end of said sheath in the passenger compartment to said actuating member and the corresponding end of said core fixedly to said carrier, means connecting the other end of said core to the movable element of the mechanism to be operated and mounting the corresponding end of said sheath fixedly to a stationary portion thereof, means operative to selectively move said carrier together with said pedal and said looped portion of said cable assembly positionally relative to said support, and means responsive to operation of said moving means to cause positional adjustment of the normal position of said pedal angularly with respect to said distal end of said carrier between a plurality of attitudes relative thereto.

* * * * *